United States Patent Office 3,480,573
Patented Nov. 25, 1969

3,480,573
BINDER COMPOSITION FOR MOLDS AND CORES COMPRISING REDUCING SUGARS AND SUGARS THAT HYDROLYZE TO FORM REDUCING SUGARS, UREA, FORMALDEHYDE, AND FURFURYL ALCOHOL
Alfred R. Thompson, Jr., Mishawaka, Ind., and William H. Foley, Chicago, Ill., assignors to Corn Products Company, New York, N.Y., a corporation of Delaware
No Drawing. Continuation-in-part of application Ser. No. 541,024, Apr. 7, 1966, which is a continuation-in-part of application Ser. No. 362,485, Apr. 24, 1964. This application Nov. 23, 1966, Ser. No. 596,423
Int. Cl. C08g 37/28, 51/74, 51/14
U.S. Cl. 260—17.2      23 Claims

ABSTRACT OF THE DISCLOSURE

A binder for foundry cores and the like comprises from 5 to 50 parts of a sugar component, from 35 to 75 parts of a urea formaldehyde component, and from 5 to 50 parts of furfuryl alcohol. The binder is used in conjunction with a "catalyst component" comprising a mixture of an acid salt, water, and sufficient additional urea to result in a mole ratio of formaldehyde to urea in the final composition of from 1.8 to 1 to 3.0 to 1. Alternatively, the sugar component may be placed in the catalyst component rather than with the urea, formaldehyde and furfuryl alcohol. The ingrediens may be simply blended together, or two or more may be prereacted together. Minor amounts of other resins or resin-forming ingredients, e.g. phenol-formaldehyde, melamine-aldehyde, melamine or the like may be added.

---

This application is a continuation-in-part of our copending application, U.S. Ser. No. 541,024, filed Apr. 7, 1966, now abandoned, which is a continuation of our abandoned application, U.S. Ser. No. 362,485, filed Apr. 24, 1964, which is a continuation-in-part of our abandoned application, U.S. Ser. No. 215,803, filed Aug. 9, 1962.

This invention relates to an improved binder composition for use in the foundry industry in the preparation of cores and molds The binder of the present invention is eminently suitable for the manufacture of sand cores, particularly those made by the so-called "hot box process."

For a number of years foundry cores and molds have been produced by the "hot box process," in which the sand and binder are invested on a heated pattern, cured, ejected from the pattern, and used in the casting of metals. This process has the advantage of speed in the mass production of cores or molds for the metal casting industry.

Heretofore, the binders most useful in this process have been the so-called "furan" resins which consist of a mixture of urea formaldehyde resin and furfuryl alcohol, used in combination with a suitable catalyst (usually ammonium chloride) to mass produce foundry cores and molds. These resins, however, have certain disadvantages. For one thing, the freshly prepared furan resins are quite viscous, only sparingly soluble in water, and will tend to solidify without the addition of a catalyst upon standing for a period of about six months.

We have now discovered a new water soluble binder composition which is a substantial improvement over the furan resins from the standpoint of hardness of the finished cores, speed of cure, storage stability and economy.

It is an object of the invention to prepare a superior binder composition for use in the metal casting industry which is simple to prepare and simple to use.

It is a further object of the invention to prepare a binder composition which permits extremely high speed of core and mold production.

Another object is the preparation of a binder which will produce harder cores and molds than those made with furan resin binders presently on the market.

A further object is the preparation of a water soluble binder having lower viscosity and better storage stability than presently available binders.

Other objects and advantages will be apparent from a reading of the specification.

We have discovered that a binder comprising furfuryl alcohol, urea, formaldehyde, and a sugar will, in the presence of water and an acidic catalyst, form excellent sand cores in an extremely short time. Preferably, the ingredients are present in the following proportions (by weight, dry basis); sugar, about 5 to about 50 parts; urea formaldehyde, about 35 parts to about 75 parts; furfuryl alcohol, about 5 to about 50 parts; plus sufficient water to dissolve the ingredients.

The binder may be prepared by merely blending the ingredients together, and this is the simplest and most economical method of preparation. It may also be prepared by reacting some or all of the ingredients, under neutral, acid or alkaline conditions. This second method of preparation has certain advantages in some situations, and this facet of the invention is fully discussed in connection with Example 10.

The urea and formaldehyde can be a simple mixture of the reagents, a urea formaldehyde condensate, or a combination thereof.

By the term "sugar" we mean those saccharides of an aldose or a ketose character, commonly known as reducing sugars, or such non-reducing saccharides which will hydrolyze to form reducing sugars. Examples of sugars and sugar-containing materials which are suitable in the present invention are dextrose, arabinose, xylose, ribose, galactose, mannose, fructose, maltose, lactose, sucrose, invert sugar, molasses, starch hydrolyzates such as corn syrup or hydrol (which is the liquor remaining after crystallization of dextrose), and the like. Compounds such as sorbitol and mannitol, on the other hand, which do not contain or supply aldehyde or ketone groups, are not very effective in the instant invention.

The catalyst may be any mineral acid or salt which will dissociate to produce an acidic environment under the conditions of the curing process. Oxalic acid may also be used, but in general the organic acids are not effective. Acidic materials which have been found to be particularly effective are ammonium sulfate, ammonium chloride, aluminum chloride, ferric chloride, ammonium nitrate, aluminum sulfate, ferric sulfate, and zinc sulfate. Also, mixtures of the aforementioned can be used.

The mol ratio of formaldehyde to urea should be in the range of about 1.8 to 1 to about 3.0 to 1, the preferred range being from about 2.0 to 1 to about 2.5 to 1. It is well-known, however, that a mixture of urea and formaldehyde having such a low mol ratio of formaldehyde to urea will polymerize or resinify in a very short time; therefore, it would not be feasible to prepare a binder having this ratio. We have avoided this difficulty by putting a part of the urea with the acidic catalyst. In other words, we prepare our binder composition in such a way that the mol ratio of the formaldehyde to the urea is in the range of about 2.8 to 1 to about 5.0 to 1, within which range there is little or no tendency to polymerize, and also prepare a separate mixture, which we call the "caltalyst component," comprising an aqueous solution of the acidic catalyst plus sufficient urea to bring the final mol ratio of formaldehyde to urea, when the binder and catalyst component are used together in the manufacture of cores or molds, to the desired range of about 1.8 to 1 to about 3.0 to 1.

A number of variations are possible. For example, all the urea could be put into the catalyst component. Another variation would be to eliminate water from the composition entirely. Furthermore, the sugar can be put into the catalyst component rather than in the binder component, provided, of course, that sufficient sugar is put into the catalyst component to result in about 5 to about 50 parts when the composition is used. This variation is illustrated in Example 11.

It should also be noted that the diluent amounts of additional resin forming ingredients, or resins, which are compatible with the system of our invention, can be added. Examples of such compatible materials are: hydroxy benzines such as phenol and resorcinol; melamine; phenolic resins; melamine resins; and the like. This variation of the invention is illustrated in Example 12.

Small amounts of additional modifier materials, such as for example, water-repellants such as the silicones, waxes, or the like, can also be added if desired.

Manufacture of sand cores or molds using our binder is extremely simple—the preferred method is first to mix the sand with the catalyst (the amount of catalyst being about 25% by weight of the binder), then add the binder in the ratio of about 1% to about 5% (based on the weight of the sand) and mix again. The mixture is then rammed or blown into a pattern heated to a temperature of from 250° F. to 600° F. and allowed to cure in situ until the core or mold has hardened sufficiently to be ejected from the pattern (dwell time). After ejection an exothermic reaction continues until the core or mold is completely cured.

The following examples will more fully illustrate our invention. They are given by way of illustration only, and are not intended to limit the invention in any way.

EXAMPLE 1

Laboratory trials were made comparing various binders, made both in accordance with the instant invention and outside the limits thereof, with three different commercially available "furan binders." In this and the following examples, the commercial products (controls) are designated by the letters A, B and C. The experimental binders are designated by a number. In the case of the controls, 25% (by weight of binder) of the manufacturer's recommended catalyst was used. In the experimental runs 25% (by weight of binder) of the following catalyst composition was used: ammonium sulfate, 20%; urea, 40%; water, 40% (percentages by weight). The urea formaldehyde component was a commercially available concentrate manufactured by Allied Chemical Company under the trade name "UF85 Concentrate." It had a mol ratio of formaldehyde to urea of about 4.6–4.8 to 1, and contained about 15% water. The hydrol had a solids content of about 70%.

Standard A.F.S. shell tensile strength cores were prepared in the following manner:

|  | Grams |
|---|---|
| A.F.S. 50–70 testing sand | 3,000 |
| Catalyst | 15 |
| Mull 1 minute in Simpson muller. | |
| Binder | 60 |
| Mull 3 minutes in Simpson muller. | |

Sand mix was then blown at 60–80 p.s.i.g. into a heated (350° F.) standard shell core test pattern. After a 20-second dwell time cores were removed from the test pattern, allowed to cool (25° C.), and tensile strength and scratch hardness were determined. In addition, sand mixes were blown into a heated pattern and tensile strength was determined on the hot cores in situ after dwell times of 15, 30, 45, and 60 seconds, using a Dietert Hot Tensile Strength Tester. These values are reported as hot tensile strength, and are an indication of the speed of cure. The results are tabulated in Table 1.

TABLE 1

|  | A | B | C | 1 | 2 | 3 | 4 | 5 | 6 | 7 | 8 | 9 |
|---|---|---|---|---|---|---|---|---|---|---|---|---|
| Percent urea formaldehyde (dry basis) |  |  |  | 52.3 | 45.3 | 35.8 | 32.4 | 29.6 | 42.2 | 0 | 35.8 | 35.8 |
| Percent furfuryl alcohol (dry basis) |  |  |  | 23.1 | 20.0 | 15.8 | 14.3 | 13.0 | 0 | 15.8 | 15.8 | 15.8 |
| Percent water |  |  |  | 13.8 | 16.0 | 18.9 | 20.0 | 20.9 | 22.5 | 25.3 | 18.9 | 18.9 |
| Percent hydrol (dry basis) |  |  |  | 10.8 | 18.7 | 29.5 | 33.3 | 36.5 | 35.3 | 58.9 |  |  |
| Percent sucrose (dry basis) |  |  |  |  |  |  |  |  |  |  | 29.5 |  |
| Percent invert sugar (dry basis) |  |  |  |  |  |  |  |  |  |  |  | 29.5 |
| Cold tensile strength, p.s.i. (30 sec. dwell time) | 388 | 367 | 433 | 431 | 453 | 447 | 427 | 301 | 478 |  | 445 | 435 |
| Scratch hardness (Dietert) | 94 | 90 | 96 | 96 | 96 | 96 | 96 | 96 | 96 |  | 96 | 96 |
| Hot tensile strength, p.s.i. 15 sec. dwell time | 54 | 34 | 49 | 34 | 24 | 20 | 11 | 0 | 0 |  | 19 | 21 |
| Hot tensile strength, p.s.i. 30 sec. dwell time | 110 | 110 | 110 | 80 | 65 | 40 | 25 | 11 | 0 |  | 39 | 42 |
| Hot tensile strength, p.s.i. 60 sec. dwell time | 207 | 231 | 243 | 183 | 153 | 66 | 48 | 30 | 0 |  | 67 | 64 |
| Brookfield viscosity at 25° C. cps |  |  |  |  |  | 420 |  |  |  |  |  |  |
| Viscosity 128 days |  |  |  |  |  | 700 |  |  |  |  |  |  |
| Viscosity 9 months |  |  |  |  | 680 | 720 |  | 1,080 |  |  |  |  |

As can be seen from Table 1, cores made with the binders of the instant invention were generally higher in cold tensile strength and scratch hardness than those made with the prior art products, indicating that stronger cores were formed. The hot tensile strengths were comparable or lower, the lower values indicating a slower cure rate. Most of them, however, were considered satisfactory for general foundry operations, i.e., those wherein extremely high speed production is not necessary. The binders of the invention showed no tendency to solidify even after 9 months of storage. Binders 6 and 7, in which the furfuryl alcohol and urea formaldehyde, respectively, were omitted, were inoperative. In Binders 8 and 9 sucrose and invert sugar, respectively, were substituted for the hydrol of 3; the results show no significant difference in properties resulting from the use of other sugars in the formulation.

EXAMPLE 2

Example 1 was repeated, except that the amount of furfuryl alcohol was varied. The results are tabluated in Table 2:

TABLE 2

|  | 10 | 11 |
|---|---|---|
| Percent UF (dry basis) | 39.6 | 31.5 |
| Percent furfuryl alcohol, (dry basis) | 6.8 | 26.0 |
| Percent water | 21.0 | 16.9 |
| Percent hydrol, (dry bsis) | 32.6 | 25.6 |
| Cold tensile strength, p.s.i. (30 seconds dwell time) | 428 | 393 |
| Scratch hardness (Dietert) | 96 | 94 |

As can be seen from the above, varying the amount of the furfuryl alcohol did not appreciably alter the properties of the binder.

EXAMPLE 3

In some foundries, extremely high speed of cure is necessary. It was believed that a system could be devised which would result in higher cure rate, but which would still make maximum use of the sugar component, by changing the mol ratio of the formaldehyde to urea in the binder from 4.6 to 1 to 3.5 to 1. Because a urea formaldehyde concentrate having a mol ratio of 3.5 to 1 is not commercially available, we prepared one by mixing UF85 (Allied Chemical Company) with 7.85% urea while heating to 165° F. A complete solution, having a reactive ingredients content of about 88%, was formed in 15 minutes. Sufficient water was added to bring the water content to about 15%. Various binders were prepared by simply mixing the components. In this series the furfuryl alcohol portions were held constant and the proportions of sugar and urea formaldehyde were varied. The catalyst systems were the same as in Example 1. Cores were made in the following manner:

| | Grams |
|---|---|
| A.F.S. 50–70 testing sand | 3,000 |
| Catalyst | 15 |
| Binder | 60 |

The mulling cycle was: Mull catalyst and sand 1 minute. Mull binder 3 minutes. The sand was blown at 60–80 p.s.i.g. into a heated (350° F.–375° F.) standard shell core test pattern. After a 45 second dwell time, cores were removed from the pattern and allowed to cool for 1 hour at 25° C., after which tensile strength was determined by the standard Dietert method.

and mulled 3 minutes. Cores were blown at a box temperature of between 450° to 480° F. A production cycle consisted of 14 seconds when the box was under the blower and 15 seconds waiting for the box to open for ejection, or a 29 second total dwell time.

Cores were made using the identical procedure except experimental binder 16 and the ammonium sulfate-urea catalyst component were used in place of the commercial binder and catalyst. In addition, experimental cores were made using a 10 second waiting period, reducing the total dwell time to 24 seconds. Tensile strengths of a number of the baked cores were run; the controls showed an average tensile strength of 250 p.s.i.; the cores made with binder 16, 320 p.s.i. Aluminum castings were made, and a visual inspection showed that the test cores produced a superior casting finish. Even with the higher strength of the test cores, no difference in shake-out properties could be detected between them and the controls.

EXAMPLE 5

This trial was made at a gray iron foundry. The core selected for the tests measured 25 inches by 8 inches by 4 inches and weighed 16½ pounds. The foundry was us-

TABLE 3

| | C | 12 | 13 | 14 | 15 | 16 | 17 |
|---|---|---|---|---|---|---|---|
| Percent urea formaldehyde concentrate 3.5–1.0 mole ratio (dry basis) | | 36.96 | 45.76 | 63.36 | 73.92 | 54.56 | 50.00 |
| Percent furfuryl alcohol (dry basis) | | 15.68 | 15.68 | 15.68 | 15.68 | 15.68 | 15.68 |
| Percent water | | 17.96 | 16.16 | 12.56 | 10.40 | 14.36 | 15.00 |
| Percent hydrol (dry basis) | | 29.40 | 22.40 | 8.40 | 0 | 15.40 | 19.32 |
| Cold tensile strength p.s.i., 45 sec. dwell time at 350° F | 433 | 322 | 420 | 350 | 210 | 440 | 463 |
| Hot tensile strength p.s.i., 15 sec. dwell time at 350° F | 49 | 0 | 24 | 69 | 73 | 48 | 20 |
| Hot tensile strength p.s.i., 30 sec. dwell time at 350° F | 110 | 13 | 55 | 202 | 214 | 174 | 92 |
| Hot tensile strength p.s.i., 60 sec. dwell time at 350° F | 243 | 38 | 118 | 220 | 230 | 248 | 192 |
| pH at 25° C | | 6.3 | 6.5 | 6.9 | 7.1 | 6.85 | 6.70 |
| Brookfield viscosity at 25° C | | 840 | 890 | 980 | 1,110 | 250 | 310 |

Hot tensile strength (cure rate of binder sand mixture) was determined with a Dietert Hot Tensile Strength Tester. The results are tabulated in Table 3.

As can be seen from Table 3 most of the test cores were as hard as or harder than the control, and the speed of cure was considerably higher in most cases. It should be noted that in the case of 15, wherein the sugar was eliminated entirely, although the core cured rapidly, it was considerably less hard and had appreciably less tensile strength than the cores made with the sugar component. The above formulations were more expensive than those of Examples 1 and 2, but they were still much cheaper to produce than furan resin binders.

Because laboratory tests can only give an indication of the operability of a foundry binder, larger scale experimental trials were made in order to evaluate the product of our invention under actual foundry conditions. Examples 4, 5 and 6 show the results of these trials.

EXAMPLE 4

This trial was made at an aluminum foundry, and the core selected for the tests measured about 28 inches high and 9 inches in diameter and weighed approximately 40 pounds. At the time of the trial the foundry was using the commercial resin and catalyst designated at C. The following procedure was used to make the cores:

| | Pounds |
|---|---|
| Kleankore #10 lake sand | 1000 |
| Silica sand, 75 g.f.n. | 500 |
| Catalyst | 6.75 |
| Binder C | 22.5 |

Sand and catalyst were mulled 3 minutes; resin was added ing the commercial binder system designated as B, the following process being employed.

| | Pounds |
|---|---|
| Kleankore sand | 1000 |
| Catalyst | 6 |
| Mull 3 minutes. | |
| Binder B | 20 |
| Mull 6 minutes. | |

Cores were blown at a box temperature of about 475° F. The cycle (blow to ejection) was 16 seconds. Test cores were made using binder 16 and the ammonium sulfate-urea catalyst component. Only 5 pounds of catalyst component were used, but in all other respects the proportions and processes were identical to the controls. The test cores were considered to be harder than the controls, and the castings made therefrom were excellent. The cycle was then reduced to 13 seconds and the catalyst component raised to 30%. The test cores were again considered comparable or superior to the controls.

EXAMPLE 6

The following trial was made at a gray iron foundry. The core selected was a small one, measuring 1½ inches by ¾ inch by 5½ inches and weighing 6 ounces. Cores were being produced as follows:

| | | |
|---|---|---|
| Wedron silica sand | lbs | 70 |
| Hollenston (local sand) | lbs | 30 |
| Water | oz | 8 |
| Catalyst | oz | 6 |
| Binder C | lbs | 2.5 |

Mix sand and water one minute. Add catalyst and continue mixing for an additional three minutes. Add resin binder and mix again for an additional three minutes for a total mixing cycle of seven minutes.

The core box temperature ranged between 340°–440° F., and the dwell time was 10 seconds. When binder 16 and the ammonium sulfate-urea catalyst component were substituted for the commercial products, cores of comparable quality were made. The dwell time was then reduced to 5 seconds with the experimental binder, and entirely satisfactory cores were again produced.

EXAMPLE 7

This example shows the effectiveness of other sugars in our binder composition. A number of binders were made up, identical to binder 16 of Example 3, except that other sugars were used in place of the hydrol. Test cores were made as in Example 3, and hot tensile strengths were determined after dwell times of 15, 30, 45, and 60 seconds. The results are tabulated in Table 4.

TABLE 4

| Sugar | 15 sec. | 30 sec. | 45 sec. | 60 sec. | Brookfield viscosity, cps. at 25° C. | pH at 25° C. |
|---|---|---|---|---|---|---|
| Corn syrup | 56 | 148 | 198 | 230 | 240 | 6.85 |
| Dextrose | 54 | 144 | 188 | 154 | 160 | 7.30 |
| Lactose | 64 | 160 | 188 | 206 | 160 | 7.45 |
| Maltose | 72 | 160 | 198 | 196 | 640 | 4.65 |
| 80% Invert sugar | 60 | 170 | 180 | 172 | 140 | 6.95 |
| Sorbitol | 34 | 122 | 158 | 90 | 140 | 7.00 |

EXAMPLE 8

This example shows effectiveness of acidic catalysts other than the ammonium sulfate of the previous examples. Binder 16 was used, and cores were again made in a manner identical to those of Example 3. The catalyst component comprised: urea, 40%; water, 40%; acid salt, 20%. As in the previous example cores were prepared, and their hot tensile strengths determined after dwell time of 15, 30, 45, and 60 seconds. The results are tabulated in Table 5.

TABLE 5

| Acid Salt | 15 sec. | 30 sec. | 45 sec. | 6. sec |
|---|---|---|---|---|
| Aluminum sulfate | 18 | 24 | 152 | 202 |
| Zinc sulfate | 0 | 14 | 39 | 74 |
| Ferric sulfate | 14 | 80 | 126 | 230 |
| Ammonium chloride | 44 | 150 | 176 | 206 |
| Aluminum chloride | 60 | 108 | 160 | 104 |
| Zinc chloride | 0 | 8 | 42 | 86 |
| Ferric chloride | 0 | 76 | 204 | 230 |
| Ammonium oxalate | 0 | 0 | 32 | 38 |

EXAMPLE 9

In this example cores were prepared as in Example 3, using binder 16, the only difference being that the urea was eliminated from the catalyst component. The hot tensile strengths after 15, 30, 45, and 60 seconds were zero.

EXAMPLE 10

Two characteristics of the blended binders were noted which might not be satisfactory for use in all foundries. One characteristic was that during curing a fair amount of formaldehyde was liberated. Although this is not a serious problem in a well-ventilated foundry, it would be extremely undesirable in one that was not well-ventilated. The second characteristic noted was that the coated sand mixes did not have a particularly long bench life; that is to say, after being coated with the binder the sand mixes would, if let stand at rather high temperatures, begin to harden after a few hours. This could be a drawback in a foundry in which a fairly long period of time elapsed between the steps of mixing and introducing the mixes into the core box. It was felt that by reacting, or condensing some or all of the ingredients of the binder and subsequently partially dehydrating these problems could be eliminated, as is shown in Table 6. (The dehydration step was performed in order to obtain a viscosity sufficient to suspend the insolubles formed during the reaction, and also to increase the rate of cure.) This example illustrates this facet of the invention. It should be noted that although the reacted resins are, of course, more expensive to prepare then the non-reacted blends, they are still less costly than the furan resins presently on the market.

In all cases (except the control, which was binder 16), the following amounts of ingredients were used:

Furfuyl alcohol—1210 grams.
UF 85 (15% $H_2O$)—1670 grams (1420 grams dry basis).
Urea—180 grams.
Hydrol (30% $H_2O$)—540 grams (378 grams dry basis).

The UF–85 and furfuryl alcohol were weighed into a four-neck, five-liter flask equipped with a thermometer, stirrer, and reflux condenser. Except in the case of number 24, the hydrol was added and the pH was adjusted to the desired reaction pH using either 44% formic acid or 25% sodium hydroxide. After pH adjustment, the urea was added and the flask heated to 105° C. The reaction temperature was obtained and held by the use of an electric heating mantle. The pH was maintained in the desired range by periodic measurement and adjustment. Reaction time was counted from the time the resin reached 105° C. until the time it was cooled.

After the required reaction time, the flask was cooled to 25° C. The refractive index (RI), pH, and viscosity were determined for all the undehydrated resins, including the control.

In the case of binder number 24, the above procedure was followed *except* no hydrol was added prior to the reaction. After the reaction the urea, formaldehyde and furfuryl alcohol had been completed, the hydrol was added and the composition was mixed.

The pH value of each reacted resin was adjusted to 7.1–7.3 where necessary. The resins were reheated to 50–55° C. and dehydrated under high vacuum until an RI of 1.5040–1.5070 was obtained.

Test cores were prepared as follows, using as the catalyst component a blend of 45% urea, 15% ammonium chloride and 40% water.

|  | Grams |
|---|---|
| Kleankore #10 Lake Sand | 3000 |
| Catalyst | 12 |
| Mull 1 minute. | |
| Binder | 60 |
| Mull 3 minutes. | |

Tensile cores were blown at 75 p.s.i. air pressure with a Redford Core Blower into a one-inch tensile specimen core box set at 425° F. Hot tensile strengths were determined (in situ) after dwell time of 30, 60 and 120 seconds. Cold tensile strengths were determined as in Example 1.

Bench life was determined as follows. After coating the sand, four standard 2 x 2 in. cylindrical test specimens were prepared using three rams. The specimens were stripped onto metal bar stock (approximately 2 in. diameter by 6 in. high) and the bar-specimen combinations were placed in a 66° C. convection air oven. Samples were removed from the oven and tested for compression strength after 10, 20, 30 and 40 minutes. Green compression was also determined on the fresh sand-resin mixture.

The data are tabulated in Table 6.

As can be seen from Table 6, reaction among all of the ingredients, or reaction among all except the hydrol, greatly improved the bench life and substantially reduced the amount of formaldehyde evolved during curing of the cores. In addition to the tabulated data, it should be noted that upon curing of binder 16 a strong odor of formaldehyde was apparent, while only a very slight formaldehyde odor was observed during curing of the reacted binders. The data in Table 6 also show that reacted binders numbers 18 and 19 (reacted under neutral conditions for 0.5 and 1 hour), number 23 (acid reaction) and number 24

(neutral reaction without hydrol present) cured about as rapidly as, and had cold tensile strengths comparable to, the control. Binders 20, 21 and 22 cured more slowly and had less tensile strength, but had superior bench life and somewhat less odor than binders 18, 19, 23 and 24. The optimum reaction conditions can readily be selected to suit the particular needs of the ultimate user. In addition to the reaction techniques set forth in this example, it is contemplated that a number of variations thereon would also be effective in minimizing the amount of formaldehyde evolved during curing and increasing the bench life; for example, the urea and formaldehyde could be reacted together and the furfuryl alcohol and sugar subsequently blended therewith, or the urea, formaldehyde and sugar could be reacted together and then blended with the furfuryl alcohol.

EXAMPLE 11

This example illustrates the variation of placing the sugar ingredient in the catalyst component rather than in the binder component. The following ingredients were reacted in accordance with the procedure set forth in Example 10, the pH being adjusted initially to 8.1 with sodium carbonate and the reaction time being 2.5 hours after the mixture had reached 105° C.:

TABLE 6

| | 18 | 19 | 20 | 21 | 22 | 23 | 24 | 16 (Control) |
|---|---|---|---|---|---|---|---|---|
| Reaction Conditions: | | | | | | | | |
| pH | 7.0 | 7.0 | 7.0 | 7.0 | 7.8 | 5.6 | 7.0 | 7.6 |
| Reaction Time (hours) | 0.5 | 1 | 3 | 5 | 1 | 1 | 1 | None |
| Reaction Characteristic | Neutral Reaction | Neutral Reaction | Neutral Reaction | Neutral Reaction | Alkaline Reaction | Acid Reaction | Neutral Reaction [1] | Blend |
| Analysis before Dehydration: | | | | | | | | |
| pH (25° C.) | 6.8 | 6.7 | 6.6 | 6.7 | 7.1 | 7.1 | 6.6 | 7.6 |
| RI (20° C.) | 1.4856 | 1.4864 | 1.4882 | 1.4914 | 1.4840 | 1.4889 | 1.4850 | 1.4822 |
| Brookfield Viscosity (at 25° C., cps.) | 192 | 236 | 236 | 280 | 234 | 440 | 360 | 250 |
| Analysis after Dehydration: | | | | | | | | |
| pH (1-1 water dilution) | 7.3 | 7.1 | 7.1 | 7.4 | 7.4 | 7.4 | 7.2 | [2] |
| RI (20° C.) | 1.5040 | 1.5065 | 1.5073 | 1.5041 | 1.5045 | 1.5060 | 1.5048 | [2] |
| Nitrogen, percent | 8.35 | 8.50 | 8.30 | 8.25 | 8.05 | 7.80 | 8.05 | [2] |
| Water, percent (Karl Fischer) | 8.0 | 9.9 | 11.2 | 12.9 | 9.2 | 12.3 | 10.8 | [2] |
| Evolved Formaldehyde, percent | 3.5 | 2.6 | 1.8 | Trace | 0.5 | 2.5 | 3.5 | [2] |
| Nonvolatiles, percent | 60.6 | 61.9 | 62.9 | 60.8 | 60.4 | 60.9 | 61.0 | [2] |
| Cured Solids, percent | 68.4 | 69.2 | 69.4 | 67.8 | 68.5 | 68.1 | 68.0 | [2] |
| Viscosity Stability, Brookfield Viscosity at 25° C. in cps.: | | | | | | | | |
| 1 day | 1,860 | 2,260 | 3,760 | 2,180 | 2,120 | 3,880 | 2,560 | |
| 6 days | 2,350 | 3,500 | 3,150 | 1,950 | 2,200 | 3,800 | 2,930 | |
| 11 days | 2,300 | 3,400 | 3,000 | 1,900 | 2,300 | 3,400 | 3,500 | |
| 27 days | 2,480 | | 3,460 | 2,140 | 2,970 | 3,880 | 4,230 | |
| Hot Tensile Strength in p.s.i., box temp. at 425° F., dwell time, sec.: | | | | | | | | |
| 30 | 24 | 20 | 14 | 5 | 10 | 21 | 32 | 32 |
| 60 | 56 | 43 | 30 | 10 | 16 | 37 | 64 | 95 |
| 120 | 166 | 136 | 70 | 30 | 25 | 123 | 150 | 176 |
| Cold Tensile Strength in p.s.i., average of six cores, dwell time 20 seconds | 384 | 352 | 293 | 180 | 173 | 374 | 387 | 366 |
| Compression Strength (p.s.i.) | | | | | | | | |
| Bench Life at 66° C. time (minutes): | | | | | | | | |
| 0 | 0.23 | 0.25 | 0.23 | 0.20 | 0.20 | 0.23 | 0.20 | 0.27 |
| 10 | 0.24 | 0.20 | 0.30 | 0.35 | 0.28 | 0.54 | 0.24 | 0.30 |
| 20 | 0.43 | 0.45 | 0.50 | 0.65 | 0.36 | 0.92 | 0.38 | 0.72 |
| 30 | 1.55 | 1.55 | 0.85 | 0.65 | 0.63 | 2.5 | 0.92 | 3.35 |
| 40 | 9.0 | 10.3 | 3.1 | 2.5 | 3.8 | 11.5 | 8.0 | 90+ |

[1] Hydrol added after reaction between ether ingredients.
[2] Not dehydrated. Evolved formaldehyde-9-10%.

| | Percent |
|---|---|
| Furfuryl alcohol | 29.4 |
| Urea | 26.2 |
| Formaldehyde | 35.4 |
| Water | 9.0 |

We shall call the reaction product "Component Y."

A second product, which we shall call "Component Z," was then prepared by mixing together, with gentle heating, the following:

| | Percent |
|---|---|
| Ammonium chloride | 8.6 |
| Urea | 25.6 |
| Starch hydrolyzate (79.5% solids, dextrose equivalent about 72%, dextrose content about 62%, dry basis) | 43.0 |
| Water (in addition to that contained in the starch hydrolyzate) | 22.8 |

Test cores were prepared using 1.7 parts of Component Y and 0.7 part of Component Z to 100 parts of sand. The cores cured as rapidly and had as high cold tensile strength as those of Example 10.

Subsequently, field trials were performed in foundries; cores prepared from the binder system, and castings made from the cores, were rated "excellent."

An advantage of this method of preparing the composition of our invention is that it substantially lowers the crystallization temperature of the "catalyst component," thereby permitting the composition to be stored outside (e.g. in the foundry "yard") during winter months without danger of its crystallizing. The product does not crystallize at temperatures as low as −30° F.

EXAMPLE 12

As was stated previously, it is possible to add diluent amounts of other resins or resin-forming ingredients to our binder without adversely affecting the overall properties of the system, provided, of course, that such additional resins or ingredients are compatible with the system. Preferably, these additional ingredients are present in amounts not exceeding 25% by weight, based on the weight of the urea, formaldehyde and furfuryl alcohol.

Such additions may be useful if it is desired to alter slightly one or more specific properties. This example illustrates two such additions.

12a.—Melamine addition

The following ingredients were mixed together:

| | Grams |
|---|---|
| Furfuryl alcohol | 900 |
| Melamine | 360 |
| UF-85 | 1,740 |

The pH of the mixture was 8.3; no pH adjustment was made. The mixture was then reacted for one hour (after the reaction temperature of 105° C. had been reached) in accordance with the procedure of Example 10, except that the reaction product was not dehydrated. The refractive index of the product was 1.4970; the pH was 7.4. We shall call the product "Component Y."

Component Z was prepared as in Example 11. Test cores were then prepared, also in accordance with Example 11.

The test cores were in most respect comparable to those prepared without added melamine. The only significant observable difference was that the melamine addition increased the time required to collapse the cured cores when they were subjected to a pressure of 90 p.s.i. at a temperature of 2,000° F.

12b.—Phenolic Resin Addition

Component Y was prepared by first reacting the following ingredients (pH adjusted initially to 8.1 with sodium carbonate) for 2.5 hours:

| | Parts |
|---|---|
| Urea | 26.2 |
| Formaldehyde | 35.2 |
| Furfuryl alcohol | 29.4 |
| Water | 9.0 |

The reaction was conducted in accordance with the method of Example 10, except the product was not dehydrated. Then 86 parts of the reacted product were mixed with 4 parts of furfuryl alcohol and 10 parts of a commercially available phenolic resin. The phenolic resin had a refractive index of 1.5532 and a pH of 6.7. Analysis showed the resin to have the following approximate composition:

| | Percent |
|---|---|
| Phenol | 39 |
| Total formaldehyde | 46 |
| Urea | 4 |
| Water | 11 |
| Free formaldehyde | 15 |

Component Z was prepared in accordance with Example 11.

Test cores were prepared using 1.95 parts of Component Y and 0.8 part of Component Z to 100 parts of sand.

The cores were generally comparable to those prepared from our binder system made without the phenolic resin addition, except that the tensile strength was somewhat higher after the cured cores had been post cured at 350° F. for 30 minutes (a practice common in some foundries).

12c.—Phenol Addition

Two additional binder systems were prepared by reacting the following ingredients to make Component Y:

| | 12c.-1 | 12c.-2 |
|---|---|---|
| Furfuryl alcohol, percent | 29.4 | 29.4 |
| UF-85, percent | 60.0 | 60.0 |
| Phenol, percent | 10.6 | 6.0 |
| Urea, percent | 0.0 | 4.9 |

Component Z was prepared in accordance with Example 11. Test cores were prepared using 1.95 parts of Component Y and 0.8 parts of Component Z to 100 parts of sand. The cores were comparable to those prepared with the phenolic resin addition.

Minor amounts of other compatible materials, e.g. resorcinol, resorcinol-aldehyde resins, or the like could also be effectively employed.

EXAMPLE 13

The foregoing examples were directed to cores made by the hot box process. This example shows that our binder is also extremely suitable in conventional core making processes and is superior to the furan resins in green strength and baked strength.

The following formulation and mulling procedure were used to prepare sand mixes:

| | Grams |
|---|---|
| A.F.S. 50–70 testing sand | 3000 |
| Cereal binder (Mogul Brand*) | 50 |
| Southern bentonite | 15 |
| Water | 75 |
| Experimental binder | 30 |
| Catalyst component (20% ammonium sulfate, 40% urea, 40% water) | 7.5 |
| Kerosene | 3.5 |

* A Trade-Mark of Corn Products Company.

Sand, cereal binder and bentonite were mulled for two minutes. Water was added and the mixture was mulled 3 minutes. Experimental binder and catalyst were mixed prior to adding to the sand mixture and mulled for three minutes. Kerosene was added and mulling continued for one additional minute. The mixture was dumped into a one-gallon pail and covered. Baking was done in a standard convection oven at 425° F. for the various times stated in Table 7.

In addition, cores were prepared using a commercially available core oil in place of the binder. The results are tabulated in Table 7.

TABLE 7

| | | Experimental Binder | | | |
|---|---|---|---|---|---|
| | Control C | 16 (from Table 3) | 3 (from Table 1) | 5 (from Table 1) | Core Oil |
| Green Compression, p.s.i | 0.79 | 0.85 | 0.85 | 0.88 | 1.25 |
| Green Shear, p.s.i | 0.64 | 0.70 | 0.71 | 0.74 | 1.05 |
| Overhang High Cam. Jolts | 92 | 118 | 248 | 228 | 300 |
| Sag High Cam. Jolts/0.030" | 38 | 34 | 56 | 51 | 300 |
| Baked Tensile Strength 5 minutes at 425° F., p.s.i | 175 | 155 | 190 | 95 | 40 |
| Baked Tensile Strength 10 minutes at 425° F., p.s.i | 200 | 160 | 215 | 190 | 40 |
| Baked Tensile Strength 15 minutes at 425° F., p.s.i | 130 | 90 | 195 | 160 | 45 |
| Baked Tensile Strength 20 minutes at 425° F., p.s.i | 115 | 75 | 165 | 160 | 60 |
| Baked Tensile Strength 25 minutes at 425° F., p.s.i | 50 | 50 | 165 | 133 | 75 |
| Baked Tensile Strength 30 minutes at 425° F., p.s.i | 50 | 50 | 150 | 120 | 90 |
| Dietert Scratch Hardness 5 minutes at 425° F | 93 | 95 | 97 | 85 | 60 |
| Dietert Scratch Hardness 10 minutes at 425° F | 95 | 92 | 98 | 97 | 75 |
| Dietert Scratch Hardness 15 minutes at 425° F | 78 | 70 | 97 | 92 | 82 |
| Dietert Scratch Hardness 20 minutes at 425° F | 65 | 50 | 94 | 87 | 80 |
| Dietert Scratch Hardness 25 minutes at 425° F | 40 | 40 | 92 | 78 | 79 |
| Dietart Scratch Hardness 30 minutes at 425° F | 40 | 40 | 88 | 74 | 79 |
| Percent Baked 10 minutes at 425° F | 41 | 47 | 41 | 42 | 22 |
| Percent Baked 20 minutes at 425° F | 70 | 79 | 81 | 79 | 38 |
| Percent Baked 30 minutes at 425° F | 100 | 100 | 100 | 100 | 41 |
| Percent Baked 45 minutes at 425° F | | | | | 58 |
| Percent Baked 60 minutes at 425° F | | | | | 89 |

We claim:

1. A potentially reactive binder composition consisting essentially of: from about 5 to about 50 parts, by weight, dry basis, of a sugar selected from the group consisting of reducing sugars and sugars which will hydrolyze to form reducing sugars; from about 35 to about 75 parts by weight, dry basis, of a urea formaldehyde component selected from the group consisting of mixtures of urea and formaldehyde, condensation products of urea and formaldehyde, and combinations thereof, the mole ratio of formaldehyde to urea being in the range of about 2.8 to about 5.0 to 1; and from about 5 to about 50 parts, by weight, dry basis, of furfuryl alcohol.

2. A binder composition consisting essentially of the reaction product of the potentially reactive composition of claim 1.

3. A binder composition consisting essentially of a blend of the following components:
(A) from about 5 to about 50 parts, by weight dry basis, of a sugar selected from the group consisting of reducing sugars and sugars which will hydrolyze to form reducing sugars; and
(B) the reaction product of
(a) from about 35 to about 75 parts, by weight, dry basis, of a urea formaldehyde component selected from the group consisting of mixtures of urea and formaldehyde, condensation products of urea and formaldehyde, and combinations thereof, the mole ratio of formaldehyde to urea being in the range of about 2.8 to 1 to about 5.0 to 1, and
(b) from about 5 to about 50 parts, by weight, dry basis, of furfuryl alcohol.

4. A composition of matter suitable for use in the preparation of cores and molds for foundry purposes consisting essentially of a binder component and a catalyst component: the binder component consisting essentially of the potentially reactive binder composition of claim 1 in the presence of water; the catalyst component comprising urea, water, and an acidic material; the mole ratio of formaldehyde to urea in the final composition being from about 1.8 to 1 to about 3.0 to 1.

5. A composition of matter suitable for use in the preparation of cores and molds for foundry purposes consisting essentially of a binder component and a catalyst component: the binder component consisting essentially of the binder composition of claim 2 in the presence of water; the catalyst component comprising urea, water, and an acidic material; the mole ratio of formaldehyde to urea in the final composition being from about 1.8 to 1 to about 3.0 to 1.

6. A composition of matter suitable for use in the preparation of cores and molds for foundry purposes consisting essentially of a binder component and a catalyst component: the binder component consisting essentially of the binder composition of claim 3 in the presence of water; the catalyst component comprising urea, water, and an acidic material; the mole ratio of formaldehyde to urea in the final composition being from about 1.8 to 1 to about 3.0 to 1.

7. Process of making a foundry core consisting essentially of the following steps: mixing a foundry sand with a catalyst component comprising urea, water, and an acidic material; adding from about 1% to about 5%, based on the weight of the sand, of an aqueous solution of the binder of claim 1; mixing; introducing the mixture into a heated pattern; permitting the core to cure in situ until it has hardened sufficiently to be ejected from the pattern; and ejecting the core from the pattern.

8. Process of making a foundry core consisting essentially of the following steps: mixing a foundry sand with a catalyst component comprising urea, water, and an acidic material, adding from about 1% to about 5%, based on the weight of the sand, of an aqueous solution of the binder of claim 2; mixing; introducing the mixture into a heated pattern; permitting the core to cure in situ until it has hardened sufficiently to be ejected from the pattern; and ejecting the core from the pattern.

9. Process of making a foundry core consisting essentially of the following steps: mixing a foundry sand with a catalyst component comprising urea, water, and an acidic material; adding from about 1% to 5%, based on the weight of the sand, of an aqueous solution of the binder of claim 3; mixing; introducing the mixture into a heated pattern; permitting the core to cure in situ until it has hardened sufficiently to be ejected from the pattern; and ejecting the core from the pattern.

10. A baked foundry core consisting essentially of a cemented mass obtained by baking, in the presence of water and an acid catalyst, foundry sand coated with from about 1% to about 5%, based on the weight of the sand, of a binder consisting essentially of: from about 5 to about 50 parts by weight of a sugar selected from the group consisting of reducing sugars and sugars which will hydrolyze to form reducing sugars; from about 45 to about 85 parts by weight of a urea formaldehyde component selected from the group consisting of mixtures of urea and formaldehyde, condensation products of urea and formaldehyde, and combinations thereof, the mole ratio of formaldehyde to urea being from about 1.8 to 1 to about 3.0 to 1; and from about 5 to about 50 parts by weight of furfuryl alcohol.

11. Composition of matter suitable for use in the preparation of cores and molds for foundry purposes consisting essentially of the following components:
(A) the reaction product of
(a) from about 35 to about 75 parts, by weight, dry basis, of a urea formaldehyde component selected from the group consisting of mixtures of urea and formaldehyde, condensation products of urea and formaldehyde, and combinations thereof, the mole ratio of formaldehyde to urea being in the range of about 2.8 to 1 to about 5.0 to 1, and
(b) from about 5 to about 50 parts, by weight, dry basis, of furfuryl alcohol, and
(B) a blend of
(a) a sugar selected from the group consisting of reducing sugars and sugars which will hydrolyze to form reducing sugars,
(b) urea,
(c) an acidic material, and
(d) water;
the sugar being present in an amount sufficient to result in from about 5 to about 50 parts of sugar, by weight, dry basis, when the composition of matter is used; and the urea being present in an amount sufficient to result in a mole of formaldehyde to urea in the range of about 1.8 to 1 to about 3.0 to 1 when said composition of matter is used.

12. A composition of matter in accordance with claim 11, including, as an additional component that is blended with said reaction product, from 0% up to about 25% by weight, based on the weight of the urea, formaldehyde, and furfuryl alcohol, of a material that is compatible with the reaction product of the urea, formaldehyde and furfuryl alcohol, and that is selected from the group consisting of compatible resins and compatible resin-forming materials.

13. A composition of matter in accordance with claim 11, wherein said additional component is phenol.

14. A composition of matter in accordance with claim 11, wherein said additional component is a phenol-formaldehyde resin.

15. A composition of matter in accordance with claim 11, wherein said additional component is melamine.

16. A composition of matter in accordance with claim 11, wherein said additional component is a melamine-aldehyde resin.

17. A composition of matter in accordance with claim 11, wherein an additional component is reacted with the urea, formaldehyde and furfuryl alcohol to form said reaction product, the additional component being from 0% up to about 25% by weight, based on the weight of the urea, formaldehyde, and furfuryl alcohol, of a material that is compatible with the urea, formaldehyde and furfuryl alcohol and that is selected from the group consisting of compatible resins and compatible resin-forming materials.

18. A composition of matter in accordance with claim 17, wherein said additional component is phenol.

19. A composition of matter in accordance with claim 17, wherein said additional component is a phenol-formaldehyde resin.

20. A composition of matter in accordance with claim 17, wherein said additional component is melamine.

21. A composition of matter in accordance with claim 17, wherein said additional component is a melamine-aldehyde resin.

22. A component for use with a resin in the manufacture of cores and molds for foundry purposes, wherein said resin consists essentially of
   (a) from about 35 to about 75 parts, by weight, dry basis, of a urea formaldehyde component selected from the group consisting of mixtures of urea and formaldehyde, condensation products of urea and formaldehyde, and combinations thereof, the mole ratio of formaldehyde to urea being in the range of about 2.8 to 1 to about 5.0 to 1;
   (b) from about 5 to about 50 parts, by weight, dry basis, of furfuryl alcohol, and
   (c) from zero up to about 25% by weight, based on the weight of the urea, formaldehyde, and furfuryl alcohol, of an additional material that is compatible with the urea, formaldehyde and furfuryl alcohol, and that is selected from the group consisting of compatible resins and compatible resin-forming materials.

said component consisting essentially of a blend of
   (a) a sugar selected from the group consisting of reducing sugars and sugars which will hydrolyze to form reducing sugars,
   (b) urea,
   (c) an acidic material, and
   (d) water;
the sugar being present in an amount sufficient to result in from about 5 to about 50 parts of sugar, by weight, dry basis, when said component is used and the urea being present in an amount sufficient to result in a mole ratio of formaldehyde to urea in the range of about 1.8 to 1 to about 3.0 to 1 when said component is used.

23. A component in accordance with claim 21, wherein said sugar is a starch hydrolyzate and said acidic material is an acid salt.

References Cited

UNITED STATES PATENTS

| 3,024,215 | 3/1962 | Freeman et al. | 260—17.2 |
| 3,059,297 | 10/1962 | Dunn et al. | |
| 3,168,489 | 2/1965 | Brown et al. | |
| 3,168,490 | 2/1965 | Brown et al. | |
| 3,182,030 | 5/1965 | Parkes | 260—17.3 |
| 3,306,864 | 2/1967 | Lang et al. | 260—17.2 |
| 3,360,492 | 12/1967 | Tsou | 260—17.3 |

FOREIGN PATENTS 954,084  4/1964  Great Britain.

OTHER REFERENCES

Chem. Abst. vol. 54: 11, 951f, 1960, "Binders for Foundry Sand" (Lieder).

Chem. Abst. vol. 54: 18, 308f, 1960, "Furfuryl Alcohol Binders for Foundry Cores" (Freeman Chem. Corp.).

WILLIAM H. SHORT, Primary Examiner

F. WOODBERRY, Assistant Examiner

U.S. Cl. X.R.

260—17.3, 38, 39

PO-1050
(5/69)

UNITED STATES PATENT OFFICE
CERTIFICATE OF CORRECTION

Patent No. 3,480,573          Dated November 25, 1969

Inventor(s) Alfred R. Thompson, Jr. and William H. Foley

It is certified that error appears in the above-identified patent and that said Letters Patent are hereby corrected as shown below:

Column 1, line 30 "ingrediens" should read "ingredients";

Column 2, line 69 "caltalyst" shoud read "catalyst";

Column 4, Table 2 "Percent water 21.0-16.9" should be "Percent water 21.0 - 16.6"; "Percent hydrol (dry basis) 32.6 - 25.6" should read "Percent hydrol (dry basis) 32.6-25.9";

Column 7, Table 5 "ammonium oxalate 0-0-32-38" should be "ammonium oxalate 0-0-32-48";

Column 8, line 32 "reaction the urea" should read "reaction between the urea";

Table 6, sub 1 "ether" should be "other";

Column 11, 12c "Urea percent 0.0-4.9" should read "urea percent 0.0-4.6";

Column 12, lines 72 and 73 "2.8 to about 5.0 to 1" should read "2.8 to 1 to about 5.0 to 1";

Column 14, line 38 "mole of" should read "mole ratio of".

SIGNED AND
SEALED
OCT 20 1970

(SEAL)
Attest:

Edward M. Fletcher, Jr.
Attesting Officer

WILLIAM E. SCHUYLER, JR.
Commissioner of Patents